US010650305B2

(12) United States Patent
Liu et al.

(10) Patent No.: US 10,650,305 B2
(45) Date of Patent: May 12, 2020

(54) SYSTEMS AND METHODS FOR RELATION INFERENCE

(71) Applicant: Baidu USA, LLC, Sunnyvale, CA (US)

(72) Inventors: Chaochun Liu, San Jose, CA (US); Nan Du, Palo Alto, CA (US); Shulong Tan, Santa Clara, CA (US); Hongliang Fei, Sunnyvale, CA (US); Wei Fan, Sunnyvale, CA (US)

(73) Assignee: Baidu USA LLC, Sunnyvale, CA (US)

( * ) Notice: Subject to any disclaimer, the term of this patent is extended or adjusted under 35 U.S.C. 154(b) by 936 days.

(21) Appl. No.: 15/205,798

(22) Filed: Jul. 8, 2016

(65) Prior Publication Data
US 2018/0012121 A1    Jan. 11, 2018

(51) Int. Cl.
| | | |
|---|---|---|
| G06N 3/04 | (2006.01) | |
| G06F 16/93 | (2019.01) | |
| G06F 16/332 | (2019.01) | |
| G06F 16/36 | (2019.01) | |
| G06N 5/02 | (2006.01) | |
| G06N 3/08 | (2006.01) | |

(52) U.S. Cl.
CPC .......... *G06N 3/0445* (2013.01); *G06F 16/332* (2019.01); *G06F 16/36* (2019.01); *G06F 16/93* (2019.01); *G06N 3/08* (2013.01); *G06N 5/022* (2013.01)

(58) Field of Classification Search
CPC ....... G06N 20/00; G06N 3/02; G06K 9/00442
USPC ..................................................... 706/15, 45
See application file for complete search history.

(56) References Cited

U.S. PATENT DOCUMENTS

| | | | |
|---|---|---|---|
| 2001/0014868 A1* | 8/2001 | Herz ................. | G06Q 10/0637 705/14.38 |
| 2004/0243548 A1 | 12/2004 | Hulten | |
| 2008/0147441 A1 | 6/2008 | Kil | |
| 2014/0101219 A1 | 4/2014 | Tang | |
| 2014/0201126 A1* | 7/2014 | Zadeh ................... | G06N 7/005 706/52 |

(Continued)

OTHER PUBLICATIONS

Final Office Action dated Sep. 13, 2019, in U.S. Appl. No. 15/215,513, (11pgs).

(Continued)

*Primary Examiner* — David R Vincent
(74) *Attorney, Agent, or Firm* — North Weber & Baugh LLP (57) ABSTRACT

Presented are relation inference methods and systems that use deep learning techniques for data mining documents to discover a relation between terms of interest in a given field covering a specific topic. For example, in the healthcare domain, various embodiments of the present disclosure provide for a relation inference system that mines large-scale medical documents in a free-text database to extract symptom and disease terms and generates relation information that aids in disease diagnosis. In embodiments, this is accomplished by training and using an RNN, such as an LSTM, a Gated Recurrent Unit (GRU), etc., that takes advantage of a term dictionary to examine co-occurrences of terms of interest within documents to discover correlations between the terms. The correlation may then be used to predict statistically most probable terms (e.g., a disease) related to a given search term (e.g., a symptom).

20 Claims, 6 Drawing Sheets

(56) References Cited

U.S. PATENT DOCUMENTS

| | | | |
|---|---|---|---|
| 2015/0012472 A1 | 1/2015 | Liang | |
| 2015/0350149 A1* | 12/2015 | Acharya | H04L 51/32 709/206 |
| 2016/0078184 A1 | 3/2016 | Konerman | |
| 2016/0085608 A1 | 3/2016 | Bovey | |
| 2016/0379229 A1* | 12/2016 | Akkiraju | G06F 16/353 705/7.31 |
| 2017/0011303 A1* | 1/2017 | Annapureddy | G06N 7/005 |
| 2017/0344899 A1* | 11/2017 | Zimmerman | G06N 20/00 |

OTHER PUBLICATIONS

Response to Non-Final Office Action filed Jun. 17, 2019, in U.S. Appl. No. 15/215,513, (20 pgs).

J. A. Bullinaria, "Recurrent neural networks", In Lecture on Neural Computation, 2015 (20 pgs).

Hochreiter et al., "Long short-term memory", Neural computation, 9(8):1735-1780, 1997, (32 pgs).

Lipton et al., "A critical review of recurrent neural networks for sequence learning", arXiv preprint arXiv:1506.00019, 2015, (38 pgs).

Pearl, "Probabilistic Reasoning in Intelligent Systems",1988, (10 pgs).

Heckerman, "A Tractable Inference Algorithm for Diagnosing Multiple Diseases", 1990, (9 pgs).

Jaakkola et al., "Variational Probabilistic Inference and the QMR-DT Network", 1999, (32 pgs).

Murphy et al.,"Loopy Belief Propagation for Approximate Inference", 1999, (9 pgs).

Ng et al.,"Approximate inference algorithms for two-layer Bayesian networks", 2000, (7 pgs).

Jernite et al., "Discovering Hidden Variables in Noisy-Or Networks using Quartet Tests", 2013, (9 pgs).

Halpern et al., "Unsupervised Learning of Noisy-Or Bayesian Networks", 2013, (10pgs).

Non-Final Office dated Mar. 15, 2019, in U.S. Appl. No. 15/215,513, (20 pgs).

Response filed Nov. 13, 2019, in related U.S. Appl. No. 15/215,513. (13pgs).

Notice of Allowance and Fee Due dated Jan. 13, 2020, in related U.S. Appl. No. 15/215,513. (10 pgs).

* cited by examiner

SYSTEMS AND METHODS FOR RELATION INFERENCE

TECHNICAL FIELD

The present invention relates to computer processing and, more particularly, to relation inference systems, devices, and methods to increase computational efficiency of data mining large-scale documents to learn term relations by using deep learning techniques.

DESCRIPTION OF THE RELATED ART

In text understanding applications, such as information retrieval, web search, and intelligent chatbot applications, it is very important to data mine for correlations between two terms that can help to understand how terms are correlated with each other. Correlation information may be used, for example, to reveal the symptom-disease relation for disease diagnosis based on medical text understanding; to find terms related to search key terms, which is crucial for information retrieval and web search; and to generate the most relevant items to continue a chat is crucial for intelligent chatbot based on chat history.

What is needed are deep learning systems and methods that can mine large-scale documents and discover a statistically reliable correlation between terms for use in various text understanding applications.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIGURE ("FIG.") 1 depicts a simplified block diagram of an exemplary computing system for mining documents that are used to train a Recurrent Neural Network (RNN) to generate relation information between terms of interest, according to various embodiments of the present disclosure.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

Furthermore, it shall be noted that: (1) certain steps may optionally be performed; (2) steps may not be limited to the specific order set forth herein; (3) certain steps may be performed in different orders; and (4) certain steps may be done concurrently.

In this document, the term "deep learning" refers to machine learning algorithms that attempt to model high-level abstractions in data by using multiple processing layers, with complex structures; the term RNN refers to a class of artificial neural networks where connections between units form a directed cycle, which has many advanced variants; the term Long Short-Term Memory (LSTM) refer to one of the RNN architectures; and the term "document," as used herein, refers to any text or record, including audio, e.g., a dialogue between a doctor and a patient, and any data derived from another document. Documents may be structured, semi-structured, or unstructured and stem from one or more sources.

Figure 1:
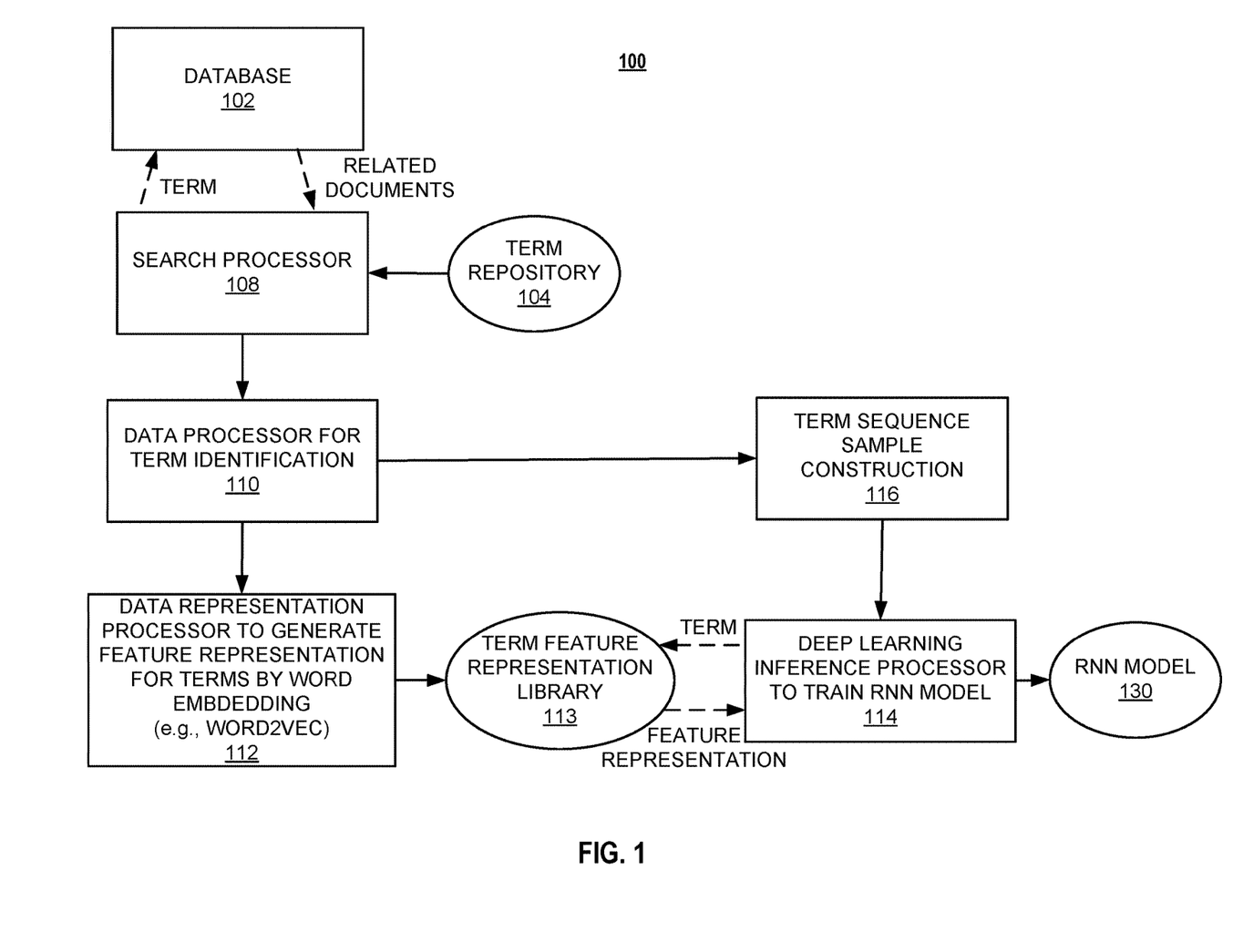

FIG. 1 illustrates an exemplary system for mining documents to train an RNN to generate relation information between terms of interest, according to various embodiments of the present disclosure. System 100 comprises database 102, search processor 108, data processor 110, data representation processor 112, term feature representation library 113, inference processor 114, and document sampler 116. In embodiments, database 102 is coupled to search processor 108 and data processor 110 is coupled to both search processor 108 and data representation processor 112. In embodiments, document sampler 116 is coupled to both data processor 110 and inference processor 114.

Database 102 may be any type of database, e.g., a web-based database that comprises large-scale documents and/or free text data derived from the Internet. In embodiments, documents comprise terms of interest in a given field, e.g., selected disease and symptom terms in the healthcare domain. Term repository 104 is any type of internal or external dictionary. In embodiments, term repository 104 comprises pre-defined terms that are related to a particular field or topic.

In embodiments, search processor 108 accesses database 102 and searches documents for one or more terms contained in term repository 104. In embodiments, the result of the search is provided to data processor 110 that identifies, for at least part of each document, the terms included and not included in term repository 104. In embodiments, data processor 110 maintains the order of the identified terms when forwarding the sequences of identified terms to data representation processor 112.

In embodiments, data representation processor 112 processes the sequences of identified terms and uses word embedding (e.g., word2vec) to generate feature representation for the identified terms. In embodiments, data representation processor 112 discards feature representations of terms that are not included in the term repository prior to placing feature representations generated for the terms that are included in the term repository into feature representation library 113. Document sampler 116 receives the sequences of identified terms and, in embodiments, selects a set of the documents from which it creates document samples that comprise two or more terms.

In embodiments, the relative position information of the sequences of identified terms in the document samples and corresponding feature representations from feature representation library 113 are input to inference processor 114. Based on this input, inference processor 114, for example, in a training phase, may train RNN model 130 to learn to predict a correlation factor. In embodiments, the correlation factor represents a predicted probability of correlation between terms and an input term. RNN model may use the number of occurrences of co-occurring terms when determining the correlation factor associated with the co-occurring terms.

In embodiments, RNN model 130 learns a function that maps an input parameter to an output parameter associated with the feature representation for terms included in the term repository. RNN model 130 may be, for example, an LSTM that learns the co-occurrence of the terms from term repository 104 to take advantage of the fact that LSTM and variants thereof can capture long-term dependencies even for terms that are not in close proximity.

Figure 2:
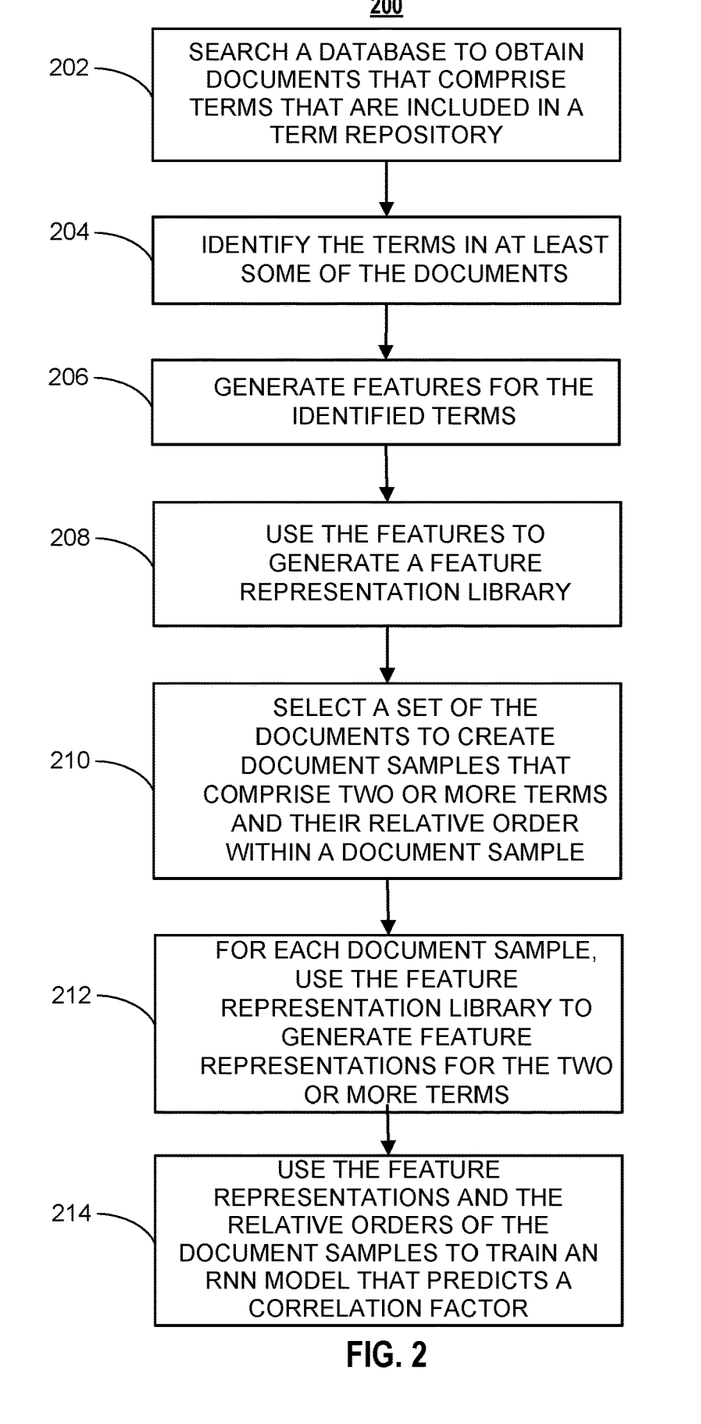
FIG. 2 is a flowchart that illustrates an exemplary method for mining documents to train an RNN to recognize a correlation between terms of interest, according to various embodiments of the present disclosure.

FIG. 2 is a flowchart that illustrates an exemplary method for mining documents to train an RNN to recognize a correlation between terms of interest, according to various embodiments of the present disclosure. The process 200 for mining documents to train the RNN begins at step 202 by searching a database, e.g., a database comprising free text data, to obtain documents that comprise terms that are included in a term repository. In embodiments, the terms in the term repository are pre-determined, for example, terms that relate to a certain field or topic.

At step 204, the terms are identified in at least some of the searched documents. In embodiments, in at least some of the documents, terms that are not included in the term repository are identified and used when generating feature representations. In embodiments, the feature representations of the terms that are not included in the term repository are not used when generating the feature representation library.

At step 206, the features are generated for the identified terms. In embodiments, the order of the identified terms is maintained.

The features are used, at step 208, to generate a feature representation library.

At step 210, a set of the documents is selected to create document samples that comprise two or more terms and their relative orders within the document samples.

At step 212, the feature representation library is used to generate feature representations for the two or more terms. In embodiments, it is the RNN model that retrieves the feature representations from the feature representation library.

At step 214, for each document sample, the feature representations and the relative orders are used to train the RNN model to predict a correlation factor.

Figure 3:
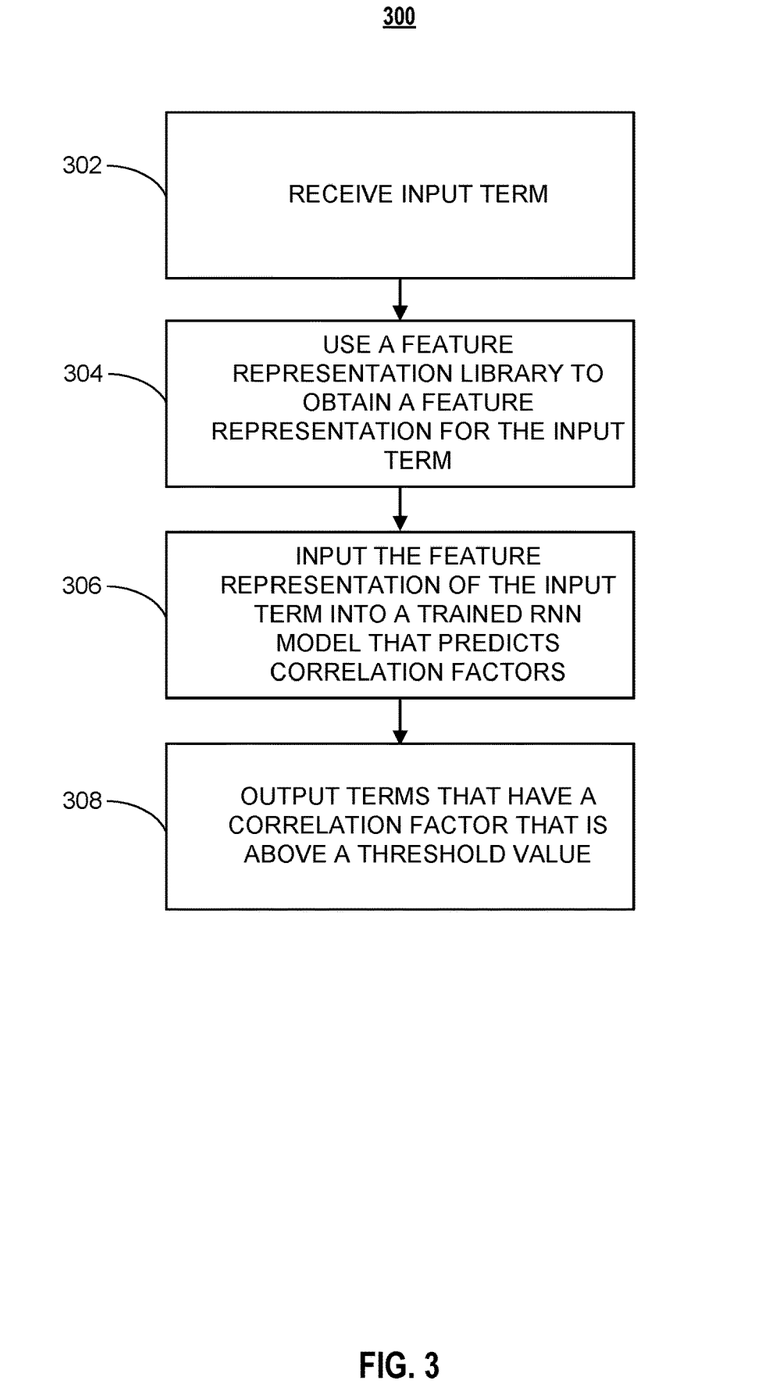
FIG. 3 is a flowchart that illustrates an exemplary method for using a trained RNN to infer a relevant term based on an input term of interest, according to various embodiments of the present disclosure.

FIG. 3 is a flowchart that illustrates an exemplary method for using a trained RNN to infer a relevant term based on an input term of interest, according to various embodiments of the present disclosure. The process 300 for using a trained RNN to infer a relevant term begins at step 302 when an input term is received.

At step 304, a feature representation for the input term is obtained by using a feature representation library, for example, after verifying that the feature representation library comprises the input term.

At step 306, the obtained feature representation of the input term is input into an RNN model. The RNN model is a trained model that predicts correlation factors that represent predicted probabilities for correlations between the input term and terms in a term repository. In embodiments, the RNN model may use a relative position information of the terms as context information, for example, after determining a certain number of terms that serve as the context information. In embodiments, the trained RNN, e.g., an LSTM, may detect a long-term dependency between two terms and use that dependency when determining the relative position information of the terms.

At step 308, terms that have a correlation factor that meets a certain threshold value are outputted. In embodiments, the correlation factor represents a predicted probability of correlation between terms and the input term.

Figure 4:
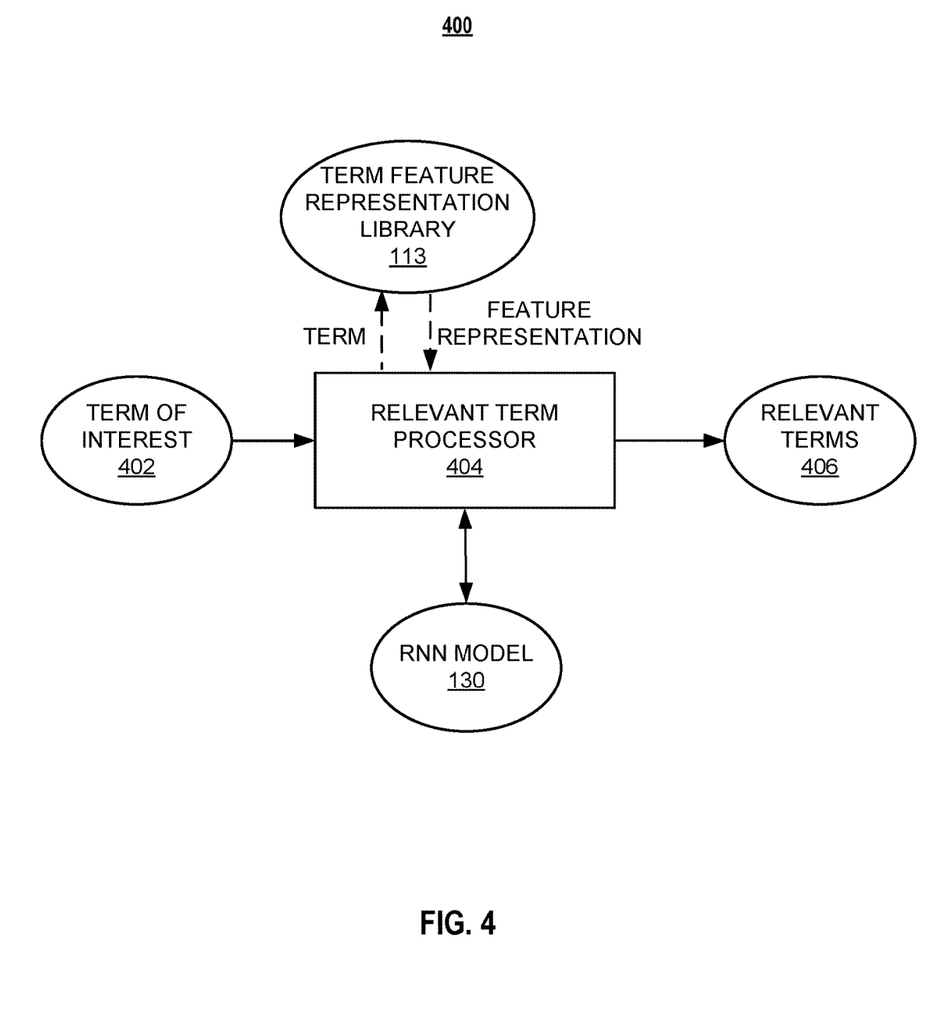
FIG. 4 depicts a simplified block diagram of an exemplary computing system for that uses a trained RNN to infer a relevant term based on an input term of interest, according to various embodiments of the present disclosure.

FIG. 4 is exemplary system for using a trained RNN to infer a relevant term based on an input term of interest, according to various embodiments of the present disclosure.

System 400 comprises feature representation library 113, RNN model 130, and relevant term processor 404. In embodiments, relevant term processor 404 receives term of interest 402 and uses feature representation library 113 to look up a corresponding feature representation that relevant term processor 404 provides to RNN model 130.

In embodiments, RNN model 130 is trained to predict correlation factors. The correlation factors may represent predicted probabilities for correlations between term of interest 402 and terms in a term repository (not shown). In embodiments, RNN model 130 predicts correlation factors based on relative position information of terms in documents that have been used to train RNN model 130. Once RNN model 130 determines the correlation factors, in embodiments, relevant term processor 404 outputs those terms that correspond to a correlation factor above a certain threshold.

In detail, in a testing phase, relevant term processor 404, in response to receiving term of interest 402 as an input term, accesses feature representation library to receive a feature representation for term of interest 402. In embodiments, relevant term processor 404 verifies that feature representation library 113 comprises term of interest 402 prior to requesting a feature representation corresponding to term of interest 402.

In embodiments, the feature representation is forwarded to RNN model 130 that uses relative position information as context information, for example, after determining a number of terms that may serve as the context information. In embodiments, RNN model 130 is an LSTM that detects a long-term dependency between two terms and uses that dependency when determining the relative position information.

In embodiments, RNN model 130 maps the feature representation for term of interest 402 to a feature representation for a term in a term repository (not shown) to generate an output parameter. In embodiments, based on the output parameter, relevant term processor 404 may generate relation information that associates at least term of interest 402 and one term from term of interest 402. Based on the relation information, relevant term processor 404 may assign inference score that measure a correlation between terms. For example, relevant term processor 404 may use a given term of interest 402 as input and utilize trained RNN model 130 to predict or retrieve the most probable terms that are correlated with term of interest 402.

Figure 5:
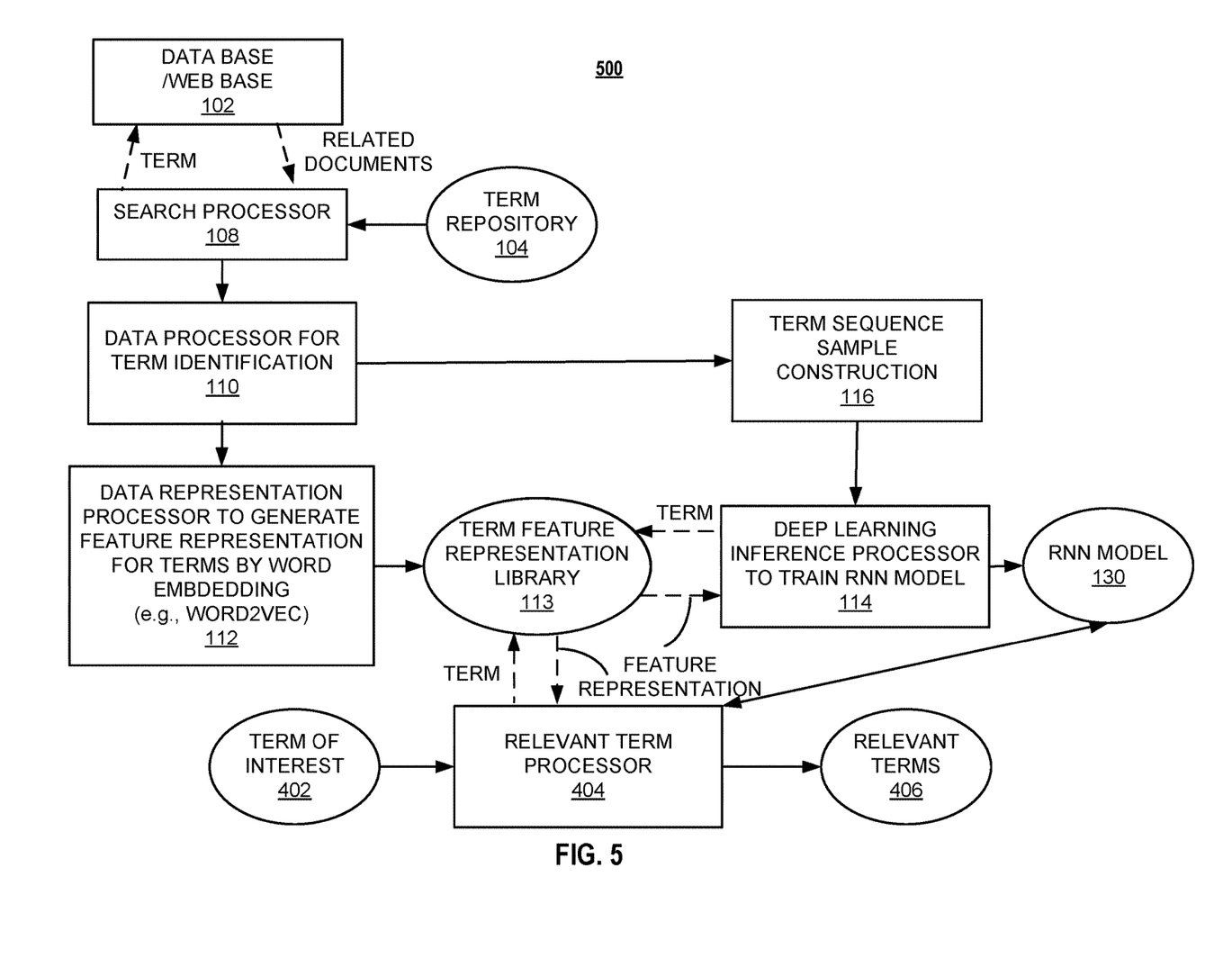
FIG. 5 illustrates an exemplary computing system for mining documents to train and use an RNN that allows to infer relevant terms, according to various embodiments of the present disclosure.

FIG. 5 illustrates an exemplary system for mining documents to train and use an RNN to generate relation information between terms of interest to infer a relevant term, according to various embodiments of the present disclosure. System 500 comprises components from FIG. 1 and FIG. 4 whose functions, for purposes of brevity, are not repeated here.

In embodiments, system 500 may be used for healthcare, knowledge graph building, information retrieval, web search, and intelligent chatbot applications. For example, in the healthcare domain, the correlation between disease and symptom is critical for disease diagnosis. A symptom may reveal the contribution of related symptoms for disease diagnosis. System 500 may mine medical documents for symptom and disease terms by examining co-occurrences of terms of interest within each document and use the correlation to generate relation information, e.g., a relevance score, that may be used to predict a relevance of co-occurring terms to aid in disease diagnosis or medical intelligent chatbot applications.

In information retrieval and web search applications, the symptom may generate related terms for search terms. In knowledge graph building applications, system 500 may reveal the closeness relation of two entities in the knowledge graph.

Figure 6:
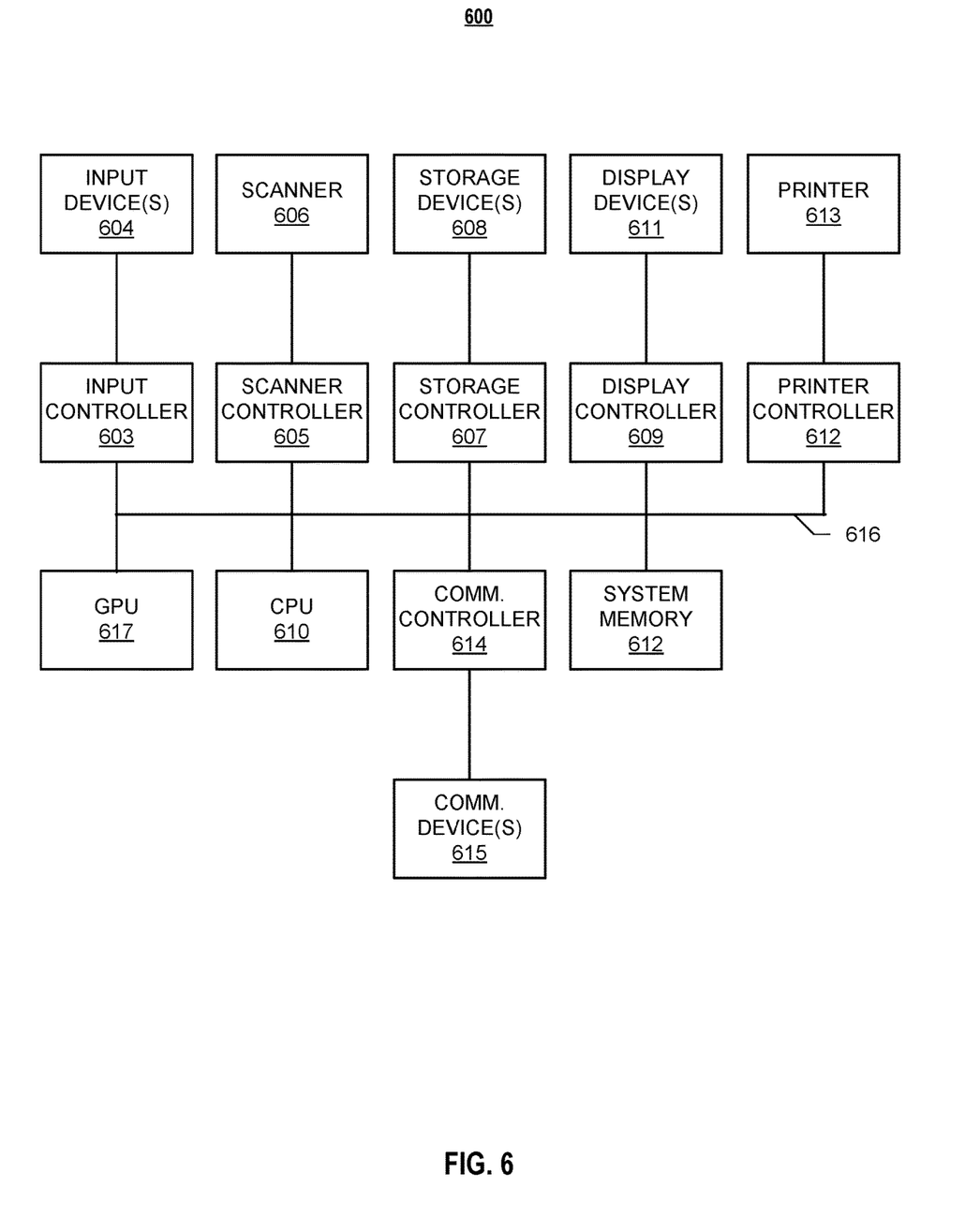
FIG. 6 depicts a simplified block diagram of a computing system comprising an RNN for generating relation information from which related terms may be inferred, according to various embodiments of the present invention.

FIG. 6 depicts a simplified block diagram of a computing system comprising an RNN for generating relation information from which related terms may be inferred, according to various embodiments of the present invention. It will be understood that the functionalities shown for system 600 may operate to support various embodiments of an information handling system—although it shall be understood that an information handling system may be differently configured and include different components.

As illustrated in FIG. 6, system 600 includes a central processing unit (CPU) 601 that provides computing resources and controls the computer. CPU 601 may be implemented with a microprocessor or the like, and may also include a graphics processor and/or a floating point coprocessor for mathematical computations. System 600 may also include a system memory 602, which may be in the form of random-access memory (RAM) and read-only memory (ROM).

A number of controllers and peripheral devices may also be provided, as shown in FIG. 6. An input controller 603 represents an interface to various input device(s) 604, such as a keyboard, mouse, or stylus. There may also be a scanner controller 605, which communicates with a scanner 606. System 600 may also include a storage controller 607 for interfacing with one or more storage devices 608 each of which includes a storage medium such as magnetic tape or disk, or an optical medium that might be used to record programs of instructions for operating systems, utilities and applications which may include embodiments of programs that implement various aspects of the present invention. Storage device(s) 608 may also be used to store processed data or data to be processed in accordance with the invention. System 600 may also include a display controller 609 for providing an interface to a display device 611, which may be a cathode ray tube (CRT), a thin film transistor (TFT) display, or other type of display. The computing system 600 may also include a printer controller 612 for communicating with a printer 613. A communications controller 614 may interface with one or more communication devices 615, which enables system 600 to connect to remote devices through any of a variety of networks including the Internet, an Ethernet cloud, an FCoE/DCB cloud, a local area network (LAN), a wide area network (WAN), a storage area network (SAN) or through any suitable electromagnetic carrier signals including infrared signals.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means"

terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It shall be noted that elements of the claims, below, may be arranged differently including having multiple dependencies, configurations, and combinations. For example, in embodiments, the subject matter of various claims may be combined with other claims.

It will be appreciated to those skilled in the art that the examples and embodiments herein are exemplary and not limiting to the scope of the present invention. It is intended that all permutations, enhancements, equivalents, combinations, and improvements thereto that are apparent to those skilled in the art upon a reading of the current document are included within the true spirit and scope of the present invention.

What is claimed is:

1. A method for training a model by examining co-occurrences of terms of interest, the method comprising:
   searching a database to obtain documents that comprise terms that are included in a term repository;
   identifying the terms in at least some of the documents;
   generating features for the identified terms to create a feature representation library;
   creating document samples that comprise two or more terms;
   for a document sample, using the feature representation library to generate feature representations for the two or more terms, and identifying relative order sequences of the terms within the document sample; and
   using the feature representations and the relative orders to train a Recurrent Neural Network (RNN) model that predicts a correlation factor between a set of terms that is related to co-occurrence of the set of terms.

2. The method of claim 1, wherein the correlation factor represents a predicted probability that terms in the set of terms are related.

3. The method of claim 1, wherein the RNN model retrieves the feature representations from the feature representation library.

4. The method of claim 1, wherein the documents are received by searching semi-structured data.

5. The method of claim 1, further comprising, in at least some of the documents, using terms that are not included in the term repository when generating feature representations.

6. The method of claim 5, further comprising not using the feature representations of the terms that are not included in the term repository when creating the feature representation library.

7. The method of claim 1, wherein the step of generating features for the identified terms comprises maintaining an order of the identified terms.

8. The method of claim 1, wherein the terms in the term repository are pre-determined.

9. The method of claim 1, wherein the RNN model considers a number of occurrences of the identified terms when predicting the correlation factor.

10. A method for using a trained Recurrent Neural Network (RNN) model to generate relational information between terms of interest, the method comprising:
    receiving an input term;
    obtaining a feature representation of the input term;
    inputting the feature representation of the input term into the trained RNN model, which has been trained using, at least in part, co-occurrence of terms in training data to gauge correlation of the terms, that predicts a correlation factor between the input term and each term from a set of terms; and
    outputting terms that have a correlation factor that is above a threshold value.

11. The method of claim 10, wherein the correlation factor represents a predicted probability of correlation between terms from a set of terms and the input term.

12. The method of claim 11, further comprising accessing a term library to verify that it comprises the input term.

13. The method of claim 11, wherein the trained RNN model uses a relative position information of terms as context information.

14. The method of claim 10, wherein the step of obtaining a feature representation of the input term comprises using a feature representation library to look up the feature representation.

15. The method of claim 11, wherein the trained RNN model is a class of recurrent neural network architecture, including traditional RNN and its advanced variants, such as a Long Short-Term Memory (LSTM) network and a Gated Recurrent Unit (GRU).

16. A non-transitory system for correlation inference between terms of interest, the system comprising:
    a search processor communicatively coupled to a database, the search processor obtains documents that comprise terms that are included in a term repository;

a data processor communicatively coupled to the search processor, the data processor identifies one or more terms in a set of documents;

a data representation processor communicatively coupled to the data processor, the data representation processor generates features for the one or more terms;

a feature representation library communicatively coupled to the data representation processor, the feature representation library stores at least some of the features;

a sampler communicatively coupled to the data processor, the sampler performs the steps of:
  using the set of the documents to create document samples that comprise two or more terms; and
  determining relative sequential orders of the two or more terms within the document samples; and a Recurrent Neural Network (RNN) model that uses the feature representations and the relative orders to predict a correlation factor.

17. The system of claim 16, further comprising a term predictor communicatively coupled to the RNN model, the term predictor performing the steps of:

receiving an input term;

obtaining a feature representation of the input term;

inputting the feature representation of the input term into the trained RNN model that predicts correlation factors for the terms of interest; and outputting terms that have a correlation factor that is above a threshold value.

18. The system of claim 16, wherein the correlation factor represents a predicted probability of correlation between an outputted term and the input term.

19. The system of claim 16, wherein the data representation processor, for at least some of the documents, generates features for terms that are not included in the term repository.

20. The system of claim 16, wherein the RNN model uses a relative position information of terms as context information.

* * * * *